United States Patent
Cullmann et al.

(10) Patent No.: US 12,480,777 B2
(45) Date of Patent: Nov. 25, 2025

(54) METHOD FOR PROVIDING ROUTE GUIDANCE, DRIVER ASSISTANCE SYSTEM, AND MOTOR VEHICLE

(71) Applicant: VOLKSWAGEN AKTIENGESELLSCHAFT, Wolfsburg (DE)

(72) Inventors: Jaqueline Cullmann, Braunschweig (DE); Julia Schettler, Gifhorn (DE); Marcel Varnhorn, Wahrenholz (DE)

(73) Assignee: VOLKSWAGEN AKTIENGESELLSCHAFT GERMANY (DE)

( * ) Notice: Subject to any disclaimer, the term of this patent is extended or adjusted under 35 U.S.C. 154(b) by 130 days.

(21) Appl. No.: 18/557,543

(22) PCT Filed: Apr. 19, 2022

(86) PCT No.: PCT/EP2022/060220
§ 371 (c)(1),
(2) Date: Oct. 26, 2023

(87) PCT Pub. No.: WO2022/228931
PCT Pub. Date: Nov. 3, 2022

(65) Prior Publication Data
US 2024/0210198 A1    Jun. 27, 2024

(30) Foreign Application Priority Data
Apr. 26, 2021    (DE) .................... 10 2021 204 135.3

(51) Int. Cl.
G01C 21/36    (2006.01)

(52) U.S. Cl.
CPC .............................. G01C 21/3641 (2013.01)

(58) Field of Classification Search
CPC .... G01C 21/34; G01C 21/3407; G01C 21/36; G01C 21/3629; G01C 21/3638;
(Continued)

(56) References Cited

U.S. PATENT DOCUMENTS

| 5,877,751 A | * | 3/1999 | Kanemitsu ......... G01C 21/3614 345/173 |
| 5,922,042 A | | 7/1999 | Sekine et al. |

(Continued)

FOREIGN PATENT DOCUMENTS

| CN | 107941221 A | 4/2018 |
| DE | 19742415 A1 | 4/1998 |
| DE | 102005050859 A1 | 6/2006 |

OTHER PUBLICATIONS

International Search Report; International Patent Application No. PCT/EP2022/060220; Aug. 23, 2022.

*Primary Examiner* — Andrew Joseph Rudy
(74) *Attorney, Agent, or Firm* — BARNES & THORNBURG LLP

(57) ABSTRACT

A method for providing route guidance for a driver of a transportation vehicle along a provided navigation route from a start to a destination wherein a check is performed to determine whether the transportation vehicle is in a predefined proximity to the destination based on a predefined criterion, and, in response to the check indicating that the transportation vehicle is in the predefined proximity to the destination based on the predefined criterion, information is output to the driver. The information output to the driver includes a prompt to the driver to terminate the route guidance prematurely and, in response to a predefined input from the driver to terminate the route guidance prematurely being detected, the route guidance is terminated.

19 Claims, 2 Drawing Sheets

(58) Field of Classification Search
CPC ............... G01C 21/3641; G01C 21/21; G01C 21/3664; G01C 21/367; G06F 3/167; H04R 5/04; G10L 15/08; G10L 21/00
USPC ...................................................... 701/516
See application file for complete search history.

(56) References Cited

U.S. PATENT DOCUMENTS

| | | | |
|---|---|---|---|
| 6,438,488 B2* | 8/2002 | Lee | G01C 21/3682 |
| | | | 701/461 |
| 6,721,653 B2* | 4/2004 | Watanabe | G01C 21/3484 |
| | | | 701/457 |
| 7,050,904 B2* | 5/2006 | Powell | G06Q 10/047 |
| | | | 701/533 |
| 7,162,365 B2* | 1/2007 | Clapper | G01C 21/34 |
| | | | 455/456.6 |
| 7,289,905 B2 | 10/2007 | Fast et al. | |
| 8,335,640 B2* | 12/2012 | Tachihana | G01C 21/3423 |
| | | | 701/25 |
| 8,589,066 B2 | 11/2013 | Haleem | |
| 9,851,215 B2 | 12/2017 | So | |
| 9,910,435 B2* | 3/2018 | Sato | B60W 60/0053 |
| 10,372,132 B2 | 8/2019 | Herz et al. | |
| 10,663,306 B2 | 5/2020 | Murai et al. | |
| 10,760,917 B2 | 9/2020 | Moore et al. | |
| 11,354,616 B1* | 6/2022 | Fields | G06Q 10/0639 |
| 11,644,330 B2* | 5/2023 | Hubbell | G01C 21/362 |
| | | | 701/410 |
| 2007/0061071 A1 | 3/2007 | Torii | |
| 2016/0356603 A1 | 12/2016 | Hajj et al. | |
| 2019/0368888 A1 | 12/2019 | Geng et al. | |
| 2022/0301432 A1* | 9/2022 | Fukui | G08G 1/096872 |

\* cited by examiner

METHOD FOR PROVIDING ROUTE GUIDANCE, DRIVER ASSISTANCE SYSTEM, AND MOTOR VEHICLE

PRIORITY CLAIM

This patent application is a U.S. National Phase of International Patent Application No. PCT/EP2022/060220, filed 19 Apr. 2022, which claims priority to German Patent Application No. 10 2021 204 135.3, filed 26 Apr. 2021, the disclosures of which are incorporated herein by reference in their entireties.

SUMMARY

Illustrative embodiments relate to a method for providing destination guidance for a driver of a transportation vehicle along a provided navigation route from a start to a destination, wherein it is checked whether the transportation vehicle is in a proximity to the destination, which proximity is predetermined according to a defined criterion, and, if the check reveals that the transportation vehicle is in the predetermined proximity to the destination according to the defined criterion, information is output to the driver. Illustrative embodiments also relate to a driver assistance system and a transportation vehicle.

BRIEF DESCRIPTION OF THE DRAWINGS

Exemplary embodiments are described in more detail below with reference to the drawings, in which.

DETAILED DESCRIPTION

Figure 1:
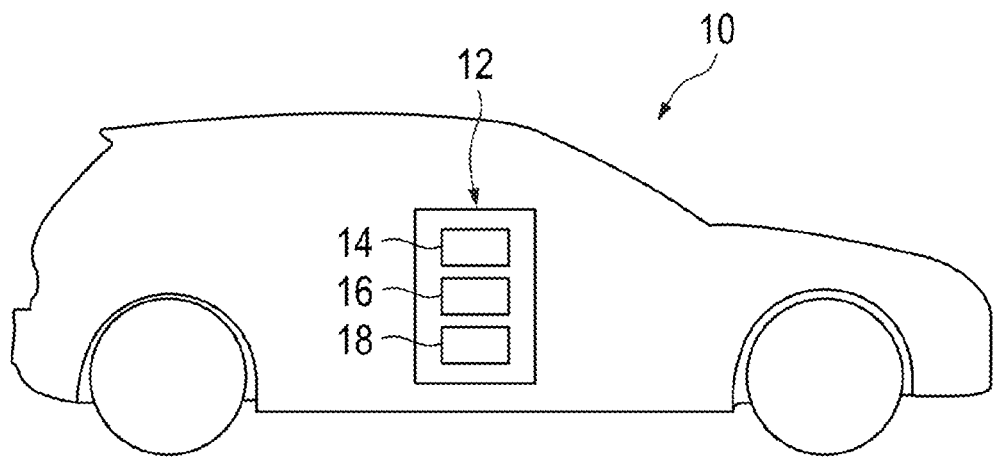
FIG. 1 shows a schematic representation of an exemplary embodiment of a transportation vehicle having a driver assistance system for providing destination guidance.

Navigation systems are known from the prior art that can navigate a driver of a transportation vehicle from a start, for instance, the current location of the transportation vehicle, to a destination, which can be defined by the driver. If the transportation vehicle has reached the destination, for example, then information can be output to the driver that the destination has been reached or that the transportation vehicle is in the immediate vicinity of the destination. Then the navigation is usually terminated after the destination location is reached.

According to U.S. Pat. No. 8,589,068 B2, a user can be made aware of facilities in the vicinity of a route to a destination. U.S. Pat. No. 10,663,306 B2 describes a navigation system that executes destination guidance from a start location to a destination location. In this case, the destination guidance is terminated when the transportation vehicle has arrived at the destination location. The destination guidance is resumed if it is ascertained that the transportation vehicle moves away again from the destination location and then approaches this destination again. According to US 2019/0368888 A1, a remaining route to a navigation destination is determined, and also key points positioned in the region of this remaining route. Then a map segment containing the remaining route and the key points determined in this region are displayed.

The disclosed embodiments provide a method, a driver assistance system and a transportation vehicle that make it possible to provide for a driver, as part of navigation, destination guidance that is adapted as well as possible to the needs of the driver.

This is achieved by a method, a driver assistance system and a transportation vehicle having the features given in the respective independent claims.

In a disclosed method for providing destination guidance for a driver of a transportation vehicle along a provided navigation route from a start to a destination, it is checked whether the transportation vehicle is in a proximity to the destination, which proximity is predetermined according to a definable criterion, and, if the check reveals that the transportation vehicle is in the predetermined proximity to the destination according to the defined criterion, information is output to the driver. The information that is output to the driver comprises a prompt to the driver for early termination of the destination guidance, and if a specific input by the driver for early termination of the destination guidance is detected, the destination guidance is terminated.

If the driver of the transportation vehicle is in active route guidance or navigation and his destination is close according to the definable criterion, then the suggestion to terminate the navigation early can be made to the driver by the outputted prompt, even when the transportation vehicle still has not reached the destination. This is based on the recognition that it can be assumed that, when destinations are known, a driver is familiar with the locality shortly before the destination and no longer needs any active route guidance. An operating suggestion of this type, which is provided by the outputted prompt, can thus relieve the driver of actions. This can significantly increase the convenience for a driver during the destination guidance.

In general, the destination guidance can be provided in the usual way by a navigation system of the transportation vehicle. This can determine on the basis of a defined destination and a defined starting point, one or more navigation routes from the start to the destination. Optionally, the driver can then select a desired route according to his criteria, and start the navigation. The starting point of such a navigation route, which is referred to here for short as the start, can easily be defined by the current position of the transportation vehicle, for example. In this case, the position of the transportation vehicle is provided by, for example, a satellite-based positioning system of the transportation vehicle, for instance, a system such as GPS (Global Positioning System). The destination location, which is referred to here simply as the destination, can be entered in the navigation system by a user, for example, for instance, by selecting a specific location in a map, by entering an address or a point of interest or the like. The navigation system outputs navigation instructions while the transportation vehicle is moving along the navigation route as part of the destination guidance. These primarily relate to directions about which way to choose at potential turnings. Such navigation instructions and also the navigation route, or at least parts thereof, can be displayed to the driver on a display device of the transportation vehicle, for instance, on a display, and/or output acoustically. As already mentioned above, the prompt to the driver for early termination of the destination guidance shall be output only when destination guidance is actually active.

In particular, the prompt to the driver for early termination of the destination guidance shall be output without the driver having to perform any control operations in the navigation menu or the navigation display beforehand for this purpose, i.e., for early termination of the destination guidance. In other words, it is thus particularly beneficial if the prompt is output independently of a previous user input to terminate the destination guidance. Thus, it is specifically not the intention that the user must first select any menu option to terminate the navigation before being asked whether the destination guidance shall be terminated early. Additional actions by the driver can be avoided, as described above, precisely because the prompt to the driver for early termination of the destination guidance is output automatically after the predetermined criterion is satisfied. This driver can then also concentrate considerably better on the traffic.

In an exemplary embodiment, the defined criterion comprises that the transportation vehicle is at a distance from the destination that is less than a definable distance threshold value. This distance threshold value may be a maximum of 10 km or in the single-digit kilometer range. For example, this can be three kilometers or between five and ten kilometers. This distance threshold value can optionally also be configurable by a user or driver of the vehicle. In addition, the distance can be measured as the crow flies or as the distance along the navigation route to the destination. Furthermore, it can also be provided that, if this distance criterion is satisfied, the prompt is output when the transportation vehicle is located at one of a plurality of definable specific locations such as, for instance, a freeway exit, at a location entrance of a location comprising the destination, or a beginning of a district comprising the destination. In these small distance ranges it is highly likely that a driver already knows his way around, especially if the destination is frequently visited.

In a further exemplary embodiment, the defined criterion comprises that a predicted travel time of the transportation vehicle from a current position of the transportation vehicle to the destination along the navigation route is less than a definable time threshold value. Thus not just a spatial distance criterion, but alternatively or additionally a time-related distance criterion can also be provided to trigger the output of the prompt. The time threshold value can also optionally be self-configurable by a driver or user, for instance, via a configuration menu of the navigation system. A spatial distance criterion, however, has the benefit over a time-related distance criterion that it is independent of possible congestion or high volume of traffic along the route.

In a further exemplary embodiment, the prompt is output under the precondition that the transportation vehicle has been in a predetermined region around the destination at least once at an earlier time. Optionally, another precondition can be that the transportation vehicle has been in the predetermined region around the destination on a certain minimum number of occasions at an earlier time. Driving data can be recorded and analyzed for this purpose. This is particularly beneficial because, based on the fact whether the transportation vehicle has already been at the destination location or in its immediate vicinity once, or even more than once, previously, it can be assessed even more reliably whether or not the driver knows his way around in the region of the destination. Accordingly, the prompt can also be output, for example, only when it can be assumed with a high degree of probability that the driver actually does know his way around in the region of the destination, as can be the case, for instance, for a frequently traveled commuting route. On the other hand, if the transportation vehicle is visiting a specific destination location for the first time, it can be assumed to be unlikely that the driver actually knows his way around the destination location. In this case, the output of the prompt for early termination of the destination guidance can accordingly be omitted, i.e., this is not output in this case. This can further increase the operating convenience for the driver, because the operating suggestion for early termination of the destination guidance as part of the prompt is output in all probability only when the driver would actually want to make use of it.

In a further exemplary embodiment, the prompt is output under the precondition that a function for outputting the prompt for early termination of the destination guidance has been activated by a user, in particular, before the destination guidance is started. In other words, the user can manually activate or deactivate the described function. If this function is deactivated, then no prompt for early termination of the destination guidance is output shortly before reaching a destination, even when it is a destination that is frequently visited. This is beneficial, for example, if a transportation vehicle is used by different drivers, and a destination is visited that is visited very frequently by one of the drivers but not by another of the drivers, who accordingly would also like to have destination guidance active until finally reaching the destination.

In a further exemplary embodiment, the prompt is output as a visual display on a display device of the transportation vehicle and/or is output acoustically. A display device of the transportation vehicle can be provided, for example, by a display belonging to the transportation vehicle. For example, such a display can also be a head-up display, or be a central display in the central console area of the transportation vehicle, and, for example, be an LCD display, OLED display or the like.

The specific input by the driver can be made via the display device, which can then simultaneously be a touchscreen, for example, or can be made manually via another operating control in the transportation vehicle. The driver can also make the specific input as a voice input, however. For example, the prompt can be formulated as a question asking whether the destination guidance shall be terminated early. This question can be answered with Yes or No by the driver, in particular, as part of voice input, or, as described, by an operating control or via a touchscreen, in particular, by Yes or No.

In a further exemplary embodiment, the prompt is output as a pop-up window on a display device of the transportation vehicle independently of a navigation display for displaying at least part of the navigation route. Such a pop-up window can be shown directly to the driver via a head-up display, for example, or on another display device, as already described. This means that such a prompt catches the driver's eye particularly well. This pop-up window need not necessarily appear in the display area of the navigation display but can also appear in an adjacent area, for example, or completely independently of whether a navigation display is currently being displayed to the driver at all. The destination guidance can also run solely in the background, for example, and relevant navigation instructions can be output to the user also solely via voice output, for example. Nonetheless, it is still possible in such a case to open, i.e., display on a display device, the pop-up window, in particular, independently of the content that this device is actually showing at this point in time, which content can be hidden temporarily by the pop-up window. This dominant appearance of the prompt makes it easier for the driver to perceive.

In addition, the disclosed embodiments also relate to a driver assistance system for a transportation vehicle for providing destination guidance for a driver of the transportation vehicle along a provided navigation route from a start to a destination, wherein the driver assistance system is designed to check whether the transportation vehicle is in a proximity to the destination, which proximity is predetermined according to a definable criterion, and if the check reveals that the transportation vehicle is in the predetermined proximity to the destination according to the defined criterion, to output information to the driver. The driver assistance system is also designed to output as part of the information that is output to the driver, a prompt to the driver for early termination of the destination guidance, and to check whether a specific input by the driver for early termination of the destination guidance has been detected, and if the specific input has been detected, to terminate the destination guidance.

The benefits specified for the disclosed method and its exemplary embodiments apply similarly to the disclosed driver assistance system.

The disclosed embodiments also include developments of the disclosed driver assistance system which have features as already described in connection with the disclosed method. For this reason, the corresponding developments of the disclosed driver assistance system are not described here again.

In addition, the disclosed embodiments also relate to a transportation vehicle comprising a disclosed driver assistance system or one of its exemplary embodiments.

The disclosed transportation vehicle may be embodied as an automotive vehicle, in particular, as a passenger car or a truck, or as a passenger bus or motorcycle.

The disclosed embodiments also comprise the combinations of the features of the described embodiments.

In the exemplary embodiments, the described components each constitute separate features of the disclosure to be considered independently of one another, which develop the disclosure in each case also independently of one another and hence can also be considered to be part of the disclosure individually or in a different combination from that shown. In addition, further features of the disclosure that have already been described can also be added to the described exemplary embodiments.

In the figures, elements with the same function are each provided with the same reference signs.

FIG. 1 shows a schematic representation of a transportation vehicle 10 having a driver assistance system 12 for providing destination guidance according to an exemplary embodiment. The driver assistance system 12 can have for this purpose a navigation system 14 having a map database, a display device 16 and a GPS receiver 18. The display device 16 can simultaneously be a touchscreen, for example, and thus additionally provide operating functions for operating the driver assistance system 12 by a user. The driver assistance system 12 can determine the position of the transportation vehicle 10 by the GPS receiver 18, and, for example, display this position in the map data provided by the navigation system 14. If the user or driver inputs a destination location, for example, then the navigation system 14 can determine and likewise display on the display device 16 a route to the destination location starting from the current location, which defines the start. The navigation system 14 can output navigation instructions likewise via the display device 16. A method for providing the destination guidance is now described in more detail with reference to FIG. 2.

Figure 2:
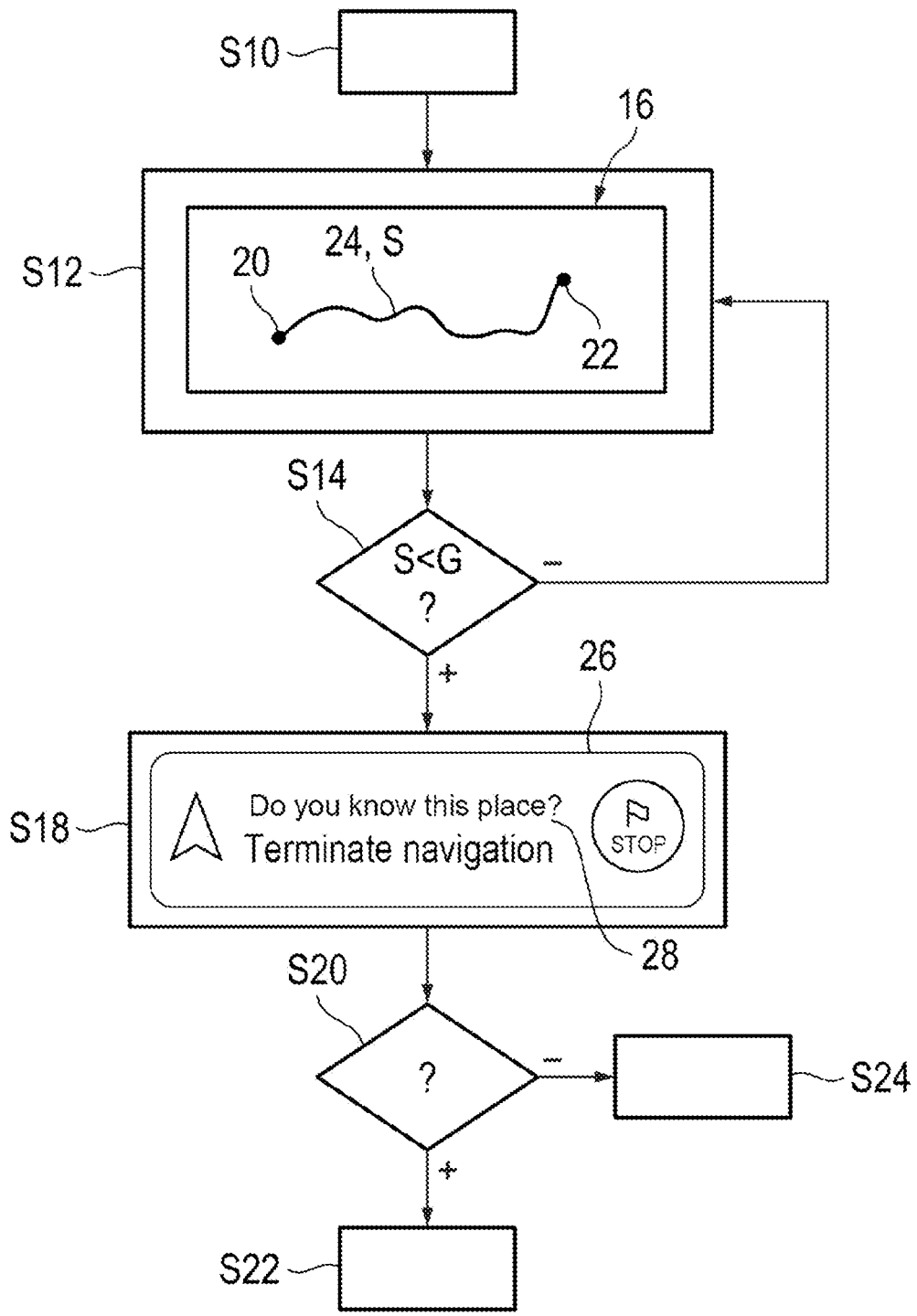
FIG. 2 shows a flow diagram to illustrate an exemplary method for providing destination guidance.

FIG. 2 shows a flow diagram to illustrate a method for providing destination guidance according to an exemplary embodiment. The method starts in operation at S10, in which is started the destination guidance for navigating a driver of the transportation vehicle 10 from a start 20 to a destination 22 along a provided navigation route 24. Then, in operation at S12, a current position of the transportation vehicle 10 is determined, and the provided navigation route 24 is updated on the basis of the current position as the new start point 20. In association with this, the navigation route 24, or at least a part thereof, can also be displayed, for example, on the display device 16, as FIG. 2 also illustrates schematically in operations at S12. The calculations and updates of the navigation route 24 need not necessarily be displayed, however, but, for example, can also run solely in the background, and only when a navigation instruction, for instance, to take a turning, is output can a suitable display be made, or the navigation instruction can even be output solely as a voice output. In the present example, the remaining navigation route 24 from the start 20, which represents the current location of the transportation vehicle 10, to the destination 22 has a certain segment length S. operation at S14 checks whether this segment length S is less than a predetermined threshold value G. For example, this can be between three and ten kilometers, for instance, five kilometers. If this is not the case, operation at S12 is repeated. Thus the navigation route 24 is updated on the basis of the current location of the transportation vehicle 10 until, at least as long as the transportation vehicle 10 is moving along the determined navigation route 24, the remaining segment S to the destination 22 is less than this limit value G. In this case, operation at S18 is then performed, in which an output is made, for instance, via the display device 16, which output comprises a prompt to the driver for early termination of the destination guidance. Such an output can appear as a pop-up window 26, for example. This need not necessarily appear in the navigation display but can also be displayed in another sub-area of the screen, or even on another display device, for instance, the instrument cluster or in a head-up display or the like. Also in this case, the output can again be made purely acoustically as a voice output. Thus the prompt, which in the present example is formulated as a question asking whether you know this place and would like to terminate the navigation, and is denoted by 28, prompts the driver to perform a suitable confirmation action provided he would like to end the navigation early. This can be a voice input or touch input or other input. Operation at S20 checks whether such an input has been detected, by which the driver indicates that he would like to terminate the destination guidance early. If this is the case, then the destination guidance is terminated early in operation at S22, even if the current location of the transportation vehicle 10 has not yet reached the predetermined destination 22. If the user does not perform such an input or makes another input, for example, to indicate that early termination of the destination guidance is not wanted, then operation at S24 is performed, in which the navigation is continued, in particular, as described with regard to operation at S12. Now, however, no further check is subsequently carried out as to whether the remaining segment S, or its segment length S, is less than the predetermined limit value G, but instead the navigation is continued until the destination 22 is reached, or terminated if another abort criterion is satisfied, for instance, that a user manually terminates the navigation by an active control operation, for instance, via a menu.

The described operating suggestion for early termination of the navigation can relieve the driver of actions, at least if the driver is familiar with the locality shortly before the destination. The output of this prompt 28 can be linked to further optional criteria, for instance, that the destination 22 has already been visited at least once at an earlier time. This can be checked on the basis of stored historical navigation data and route data. The more often the same destination 22 has been visited, the more likely it is that the driver is familiar with the locality in the region of this destination 22.

Overall, the disclosed embodiments can provide feed cards for a smart digital assistant for the navigation domain that provide situational and temporary operating suggestions, in this case for early termination of the navigation, thereby making the operation by a driver of the transportation vehicle significantly easier.

LIST OF REFERENCE SIGNS 10 transportation vehicle
12 driver assistance system
14 navigation system
16 display device
18 GPS receiver
20 start
22 destination
24 navigation route
26 pop-up window
28 prompt
G threshold value
S segment length
S10 operation
S12 operation
S14 operation
S18 operation
S20 operation
S22 operation
S24 operation

The invention claimed is:

1. A method for providing destination guidance for a driver of a transportation vehicle along a provided navigation route from a start to a destination, the method comprising:
   checking whether the transportation vehicle is in a proximity to the destination, which proximity is predetermined based on defined criteria;
   in response to the check revealing that the transportation vehicle is within the predetermined proximity to the destination based on the defined criteria, automatically outputting information to the driver, wherein the information that is output to the driver comprises a prompt to the driver requesting whether the driver would like to request early termination of the destination guidance prior to the transportation vehicle arriving at the destination; and
   in response to detection of a specific input by the driver instructing early termination of the destination guidance, automatically terminating the destination guidance, wherein the defined criteria comprises whether a predicted travel time of the transportation vehicle from a current position of the transportation vehicle to the destination along the navigation route is less than a definable time threshold value.

2. The method of claim 1, wherein the prompt is output independently of a previous user input to terminate the destination guidance.

3. The method of claim 1, wherein the defined criteria comprises that the transportation vehicle is at a distance from the destination that is less than a definable distance threshold value.

4. The method of claim 1, wherein the prompt is only output provided the transportation vehicle is in a predetermined region around the destination at least a minimum number of occasions at an earlier time as indicated based on stored historical navigation data and route data.

5. The method of claim 1, wherein the prompt is only output provided the transportation vehicle is in a predetermined region around the destination at least once at an earlier time.

6. The method of claim 1, wherein the prompt is only output provided a function for outputting the prompt for early termination of the destination guidance is activated by a user.

7. The method of claim 1, wherein the prompt is output as a visual display on a display device of the transportation vehicle, and/or is output acoustically.

8. The method of claim 1, wherein the prompt is output as a pop-up window on a display device of the transportation vehicle independently of a navigation display for displaying at least part of the navigation route.

9. The method of claim 1, wherein the prompt is output under the precondition that a function for outputting the prompt for early termination of the destination guidance has been activated by a user before the destination guidance started to provide differentiated functionality available to different drivers of the transportation vehicle, who may have or have not visited a destination in the transportation vehicle at an earlier time.

10. A driver assistance system for a transportation vehicle for providing destination guidance for a driver of the transportation vehicle along a provided navigation route from a start to a destination,
   wherein the driver assistance system checks whether the transportation vehicle is in a proximity to the destination, which proximity is predetermined based on definable criteria, and in response to the check revealing that the transportation vehicle is in the predetermined proximity to the destination based on the defined criteria, to output information to the driver,
   wherein the driver assistance system automatically outputs, as part of the information that is output to the driver, a prompt to the driver requesting whether the driver would like to request early termination of the destination guidance prior to the transportation vehicle arriving at the destination, and checks whether a specific input by the driver instructs early termination of the destination guidance has been detected, and, in response to the specific input being detected, automatically terminates the destination guidance, wherein the defined criteria comprises whether a predicted travel time of the transportation vehicle from a current position of the transportation vehicle to the destination along the navigation route is less than a definable time threshold value.

11. The driver assistance system of claim 10, wherein the prompt is output independently of a previous user input to terminate the destination guidance.

12. The driver assistance system of claim 11, wherein the defined criteria comprises that the transportation vehicle is at a distance from the destination that is less than a definable distance threshold value.

13. The driver assistance system of claim 11, wherein the prompt is output under the precondition that a function for outputting the prompt for early termination of the destination guidance has been activated by a user before the destination guidance started to provide differentiated functionality available to different drivers of the transportation vehicle, who may have or have not visited a destination in the transportation vehicle at an earlier time.

14. The driver assistance system of claim 11, wherein the prompt is only output provided the transportation vehicle is in a predetermined region around the destination at least once at an earlier time.

15. The driver assistance system of claim 11, wherein the prompt is only output provided a function for outputting the prompt for early termination of the destination guidance is activated by a user.

16. The driver assistance system of claim 11, wherein the prompt is output as a visual display on a display device of the transportation vehicle, and/or is output acoustically.

17. The driver assistance system of claim 11, wherein the prompt is output as a pop-up window on a display device of the transportation vehicle independently of a navigation display for displaying at least part of the navigation route.

18. The driver assistance system of claim 11, wherein the prompt is only output provided the transportation vehicle is in a predetermined region around the destination at least a minimum number of occasions at an earlier time as indicated based on stored historical navigation data and route data.

19. A transportation vehicle comprising the driver assistance system of claim 10.

\* \* \* \* \*